US010949676B2

(12) United States Patent
Shah et al.

(10) Patent No.: US 10,949,676 B2
(45) Date of Patent: Mar. 16, 2021

(54) AERIAL MONITORING SYSTEM AND METHOD FOR IDENTIFYING AND LOCATING OBJECT FEATURES

(71) Applicant: Accenture Global Solutions Limited, Dublin (IE)

(72) Inventors: Ketan Shah, Mumbai (IN); Chandan Kumar, Bihar (IN); Sanjay Rawat, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 123 days.

(21) Appl. No.: 15/948,256

(22) Filed: Apr. 9, 2018

(65) Prior Publication Data

US 2019/0311203 A1    Oct. 10, 2019

(51) Int. Cl.
*G06K 9/00* (2006.01)
*G06K 9/62* (2006.01)
(Continued)

(52) U.S. Cl.
CPC ........ *G06K 9/00771* (2013.01); *B64C 39/024* (2013.01); *G01S 19/51* (2013.01);
(Continued)

(58) Field of Classification Search
CPC .... G06K 9/00771; G06K 9/52; G06K 9/6215; G06K 9/6218; G06K 9/6259; G06K 9/66; G06K 9/0063; G06K 9/6256; G06K 9/4609; G06K 9/627; G06K 9/34; G06K 2209/053; B64C 39/024; B64C 2201/123; B64C 2201/126; G01S 19/51; G06N 3/08;
(Continued)

(56) References Cited

U.S. PATENT DOCUMENTS 9,524,450 B2    12/2016    Ravendran et al.
2005/0185835 A1    8/2005    Matsugu et al.
(Continued)

OTHER PUBLICATIONS

Image Mosaicing for Uav Application, Huang et al, IEEE, 2008 (Year: 2008).*

(Continued)

*Primary Examiner* — Jianxun Yang
(74) *Attorney, Agent, or Firm* — Plumsea Law Group, LLC

(57) ABSTRACT

An aerial monitoring system and method for identification and location of object features is disclosed. The aerial monitoring system and method includes training an image processing engine to identify predefined object features in images. Training involves the image processing engine generating a model for identifying predefined object features in images. Identifying the predefined object features includes using a drone outfitted with a drone camera to capture and geotag monitoring images of target objects. The monitoring images are both infrared and non-infrared. The image processing engine applies the model to the monitoring images to determine whether the monitoring images include object features that fit within one of multiple categories. The image processing engine uses a fuzzy clustering process to group objects into cluster locations. The image processing system outputs the identification and location of the object features. The output is used for maintenance planning related to the objects.

20 Claims, 9 Drawing Sheets

(51) Int. Cl.
  G06K 9/66      (2006.01)
  B64C 39/02     (2006.01)
  G01S 19/51     (2010.01)
  G06N 3/08      (2006.01)
(52) U.S. Cl.
  CPC ......... *G06K 9/6215* (2013.01); *G06K 9/6218* (2013.01); *G06K 9/6259* (2013.01); *G06K 9/66* (2013.01); *G06N 3/08* (2013.01); *B64C 2201/123* (2013.01); *B64C 2201/126* (2013.01)
(58) Field of Classification Search
  CPC ........... G06T 7/62; G06T 17/05; H04N 7/185; H04N 7/181; G05D 1/0202
  See application file for complete search history.

(56) References Cited

U.S. PATENT DOCUMENTS

| | | | | |
|---|---|---|---|---|
| 2007/0064983 | A1* | 3/2007 | Huang | G06K 9/34 382/128 |
| 2015/0139485 | A1 | 5/2015 | Bourdev | |
| 2016/0117573 | A1* | 4/2016 | Sorgi | G06K 9/4604 382/201 |
| 2017/0053169 | A1* | 2/2017 | Cuban | H04N 7/185 |
| 2017/0075928 | A1* | 3/2017 | Fedorov | G06F 16/56 |
| 2017/0277966 | A1* | 9/2017 | Abousleman | G06T 7/13 |
| 2017/0287170 | A1 | 10/2017 | Perona et al. | |
| 2019/0026531 | A1* | 1/2019 | Alvarez Gonzalez | G06K 9/0063 |

OTHER PUBLICATIONS

Chong, Y. et al, Automatic Defect Inspection Using Deep Learning for Solar Farm (2017) ; URL: https://software.intel.com/en-us/articles/automatic-defect-inspection-using-deep-learning-for-solarfarm ; [Retrieved from internet: Sep. 10, 2019].

Kang, D., & Cha, Y., Autonomous UAVs for Structural Health Monitoring Using Deep Learning and an Ultrasonic Beacon System with Geo-Tagging. Computer-Aided Civil and Infrastructure Engineering, 33(10) (2018), pp. 885-902 ; URL: https://doi.org/10.1111/mice.12375 ; [Retrieved from internet: Oct. 14, 2019].

Li, X. et al., Intelligent Fault Pattern Recognition of Aerial Photovoltaic Module Images Based on Deep Learning Technique. Proceedings of The 9th International Multi-Conference on Complexity, Informatics and Cybernetics (IMCIC) (2018) ; URL: http://www.iiis.org/CDs2018/CD2018Spring/papers/ZA018HS.pdf; [Retrieved from internet: Mar. 10, 2019].

Hosseinpoor, H. R. et al., Pricise Target Geolocation and Tracking Based on UAV Video Imagery. The International Archives of Photogrammetry, Remote Sensing and Spatial Information Sciences 41 (2016): p. 243 ; URL: http://www.int-arch-photogramm-remote-sens-spatial-inf-sci.net/XLI-B6/243/2016/isprs-archives-XLIB6-243-2016.pdf ; Retrieved from internet: Apr. 10, 2019].

Examination Report dated Oct. 16, 2019 for Australian Patent Application No. 2019201977.

Chong, Y. et al., Automatic Defect Inspection Using Deep Learning for Solar Farm (2017) ; https://software.intel.com/en-us/articles/automatic-defect-inspection-using-deep-learning-for-solar-farm [retrieved Sep. 10, 2019].

Australian Office Action dated Mar. 6, 2020 for Australian patent application No. 2019201977.

Response to 2nd Examination Report filed on Jul. 10, 2020 for Australian Patent Application No. 2019201977.

3rd Examination Report dated Jul. 28, 2020 for Australian Patent Application No. 2019201977.

Notice of Acceptance of Patent Application dated Aug. 17, 2020 for Australian Patent Application No. 2019201977.

* cited by examiner

| CLUSTER ID | ISSUE CATEGORY | PROBABILITY | LOCATION ACCURACY | CONFIRM DAMAGE | INITIATE MAINTENANCE | IMAGE | LOCATION |
|---|---|---|---|---|---|---|---|
| 8 | PHYSICAL DAMAGE | 84% - HIGH | 2m - HIGH | YES | NO |  | LOCATE |
| 10 | PHYSICAL DAMAGE | 65% - MED | 1m - HIGH | NO | YES |  | LOCATE |
| 44 | THERMAL DAMAGE | 66% - HIGH | 9m - HIGH | YES | YES |  | LOCATE |
| 58 | THERMAL DAMAGE | 90% - HIGH | 7m - HIGH | YES | NO |  | LOCATE |

AERIAL MONITORING SYSTEM AND METHOD FOR IDENTIFYING AND LOCATING OBJECT FEATURES

TECHNICAL FIELD

The present disclosure generally relates to aerial monitoring. More specifically, the present disclosure generally relates to an aerial monitoring system and method for detecting object features. Even more specifically, the present disclosure relates to an aerial monitoring system and method for identifying and locating object features.

BACKGROUND

Aerial monitoring is a way of inspecting large areas of space. For example, aerial monitoring can be used to monitor the solar panels of a large solar park for problems. During aerial monitoring of a solar park, a drone outfitted with a camera can fly to the location of the solar panels and capture images of the solar panels. Aerial monitoring can allow large areas covered by solar panels to be monitored faster than a human physically visiting the solar panels. Using aerial monitoring can be advantageous for monitoring thousands of solar panels in parks sprawling on hectares of land. However, aerial monitoring typically still requires humans to manually inspect the images for certain problems that require maintenance (e.g., problems or issues that make solar panels less effective). Accordingly, the duration of inspection is limited by how quickly a human can recognize images. Additionally, the duration of inspection is limited by how quickly a human can determine the location of the solar panel. In some cases, a drone may not have enough battery life to efficiently complete inspection without going back to a charging station. Furthermore, humans make many errors when inspecting solar panels.

There is a need in the art for a system and method that addresses the shortcomings discussed above.

SUMMARY

An aerial monitoring system and method for identification and location of predefined object features is disclosed. The aerial monitoring system and method solves the problems discussed above by digitally identifying and locating predefined object features. By using a convolutional neural network (CNN) process, the aerial monitoring system and method decreases the duration of identifying the predefined object features and increases the precision of identifying the predefined object features. The aerial monitoring system and method further increases the precision of identifying the predefined object features by using a camera with infrared and geotagging capabilities, which allow the system and method to capture thermal images and to record locations of object features. The aerial monitoring system and method decreases the duration of locating the object by using a fuzzy clustering process. The aerial monitoring system and method improves its own efficiency and precision by learning from feedback each time the aerial monitoring system processes an image. By reducing the duration of identifying and locating predefined object features on objects, in real time, more images can be processed for each battery cycle of a drone.

In one aspect, the disclosure provides a method of using an aerial monitoring system for identifying and locating object features to create a maintenance plan. The method may include receiving training images of training objects, wherein the training images include predefined object features. The method may also include building a convolutional neural network using the training images. The method may include receiving monitoring images of monitoring objects and geotags indicating global positioning system coordinates of the monitoring objects appearing in the monitoring images, wherein the monitoring images include monitoring image object features. The method may include using the convolutional neural network to analyze the monitoring image object features for similarity with the predefined object features. The method may include categorizing the monitoring images based on the analysis of the monitoring images. The method may include using the global positioning system coordinates of the monitoring objects and a fuzzy clustering process to group the monitoring objects into cluster locations. The method may include outputting a first category and a first cluster location for a first monitoring object of the monitoring objects based on the results of both categorizing the monitoring images and grouping the monitoring objects into cluster locations.

In another aspect, output from outputting a first category and a first location may be used to deploy one of a first type of maintenance unit and a second type of maintenance unit.

In another aspect, the above-mentioned first type of maintenance unit may be an inspection unit and the second type of maintenance unit is a repair unit.

In another aspect, the above-mentioned output may be used to deploy a maintenance unit to a first monitoring object feature having a higher probability of being properly identified relative to a second monitoring object having a lower probability of being properly identified.

In another aspect, the above-mentioned method wherein both the training images and the monitoring images may include both infrared and non-infrared images.

In another aspect, the above-mentioned training images include both labeled and unlabeled images.

In another aspect, the above-mentioned method may further comprise outputting the probability that the first monitoring image has been properly categorized.

In another aspect, the above-mentioned method may further comprise outputting the accuracy of grouping the first monitoring image in the first cluster location.

In another aspect, the above-mentioned monitoring images may be captured by a camera on a drone.

In yet another aspect, the disclosure provides a non-transitory computer-readable medium storing software that may comprise instructions executable by one or more computers which, upon such execution, cause the one or more computers to: (1) receive training images of training objects, wherein the training images include predefined object features; (2) build a convolutional neural network using the training images; (3) receive monitoring images of monitoring objects and geotags indicating global positioning system coordinates of the monitoring objects appearing in the monitoring images, wherein the monitoring images include monitoring image object features; (4) use the convolutional neural network to analyze the monitoring image object features for similarity with the predefined object features; (5) categorize the monitoring images based on the analysis of the monitoring images; (6) use the global positioning system coordinates of the monitoring objects and a fuzzy clustering process to group the monitoring objects into cluster locations; and (7) output a first category and a first cluster location for a first monitoring object of the monitoring objects based on the results of both categorizing the monitoring images and grouping the monitoring objects into cluster locations.

In another aspect, both the training images and the monitoring images may include both infrared and non-infrared images.

In another aspect, the training images may include both labeled and unlabeled images.

In another aspect, the instructions executable by one or more computers, upon execution, may cause the one or more computers to output the probability that the first monitoring image has been properly categorized.

In another aspect, the instructions executable by one or more computers, upon execution, may cause the one or more computers to output the accuracy of grouping the first monitoring image in the first cluster location.

In another aspect, the monitoring images may be captured by a camera on a drone.

In yet another aspect, the disclosure provides an aerial monitoring system for identifying and locating object features to create a maintenance plan, which comprises one or more computers and one or more storage devices storing instructions that may be operable, when executed by the one or more computers, to cause the one or more computers to: (1) receive training images of training objects, wherein the training images include predefined object features; (2) build a convolutional neural network using the training images; (3) receive monitoring images of monitoring objects and geotags indicating global positioning system coordinates of the monitoring objects appearing in the monitoring images, wherein the monitoring images include monitoring image object features; (4) use the convolutional neural network to analyze the monitoring image object features for similarity with the predefined object features; (5) categorize the monitoring images based on the analysis of the monitoring images; (6) use the global positioning system coordinates of the monitoring objects and a fuzzy clustering process to group the monitoring objects into cluster locations; and (7) output a first category and a first cluster location for a first monitoring object of the monitoring objects based on the results of both categorizing the monitoring images and grouping the monitoring objects into cluster locations.

In another aspect, both the training images and the monitoring images may include both infrared and non-infrared images.

In another aspect, the training images may include both labeled and unlabeled images.

In another aspect, the instructions may be operable, when executed by the one or more computers, to cause the one or more computers to output the probability that the first monitoring image has been properly categorized.

In another aspect, the instructions may be operable, when executed by the one or more computers, to cause the one or more computers to output the accuracy of grouping the first monitoring image in the first cluster location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
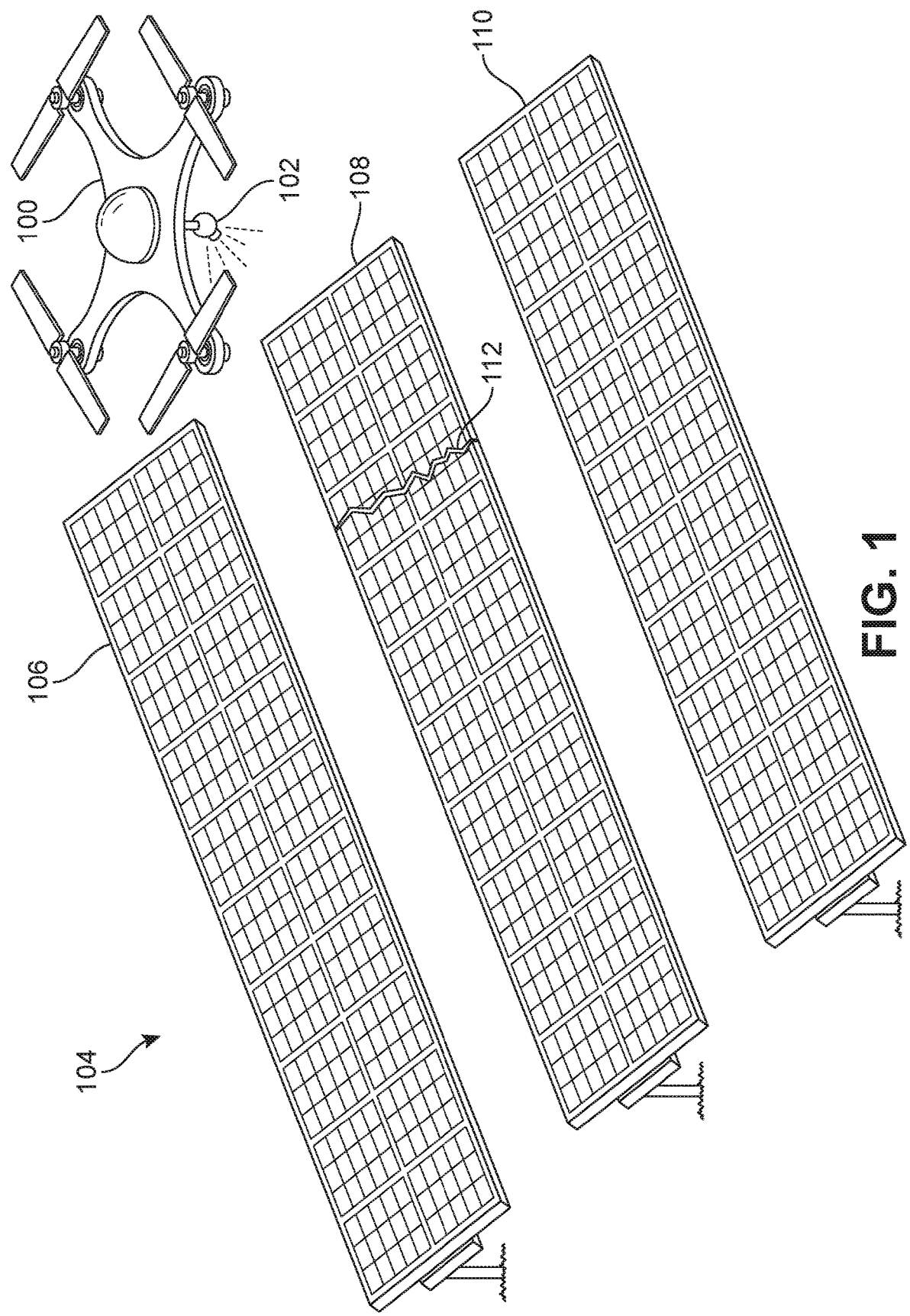
FIG. 1 is a schematic diagram of an embodiment of a drone camera capturing images of solar panels in a solar park.

An aerial monitoring system and method for identification and location of object features is disclosed. Generally, the aerial monitoring system and method includes training an image processing engine to identify predefined object features in images. During training, the image processing engine generates a model (e.g., a CNN) for identifying predefined object features in images. Then, the image processing engine practices using the model with training images that are both infrared and non-infrared. The image processing engine uses the feedback from the practice to improve the application of the model. To identify object features, the aerial monitoring system and method generally includes using a drone outfitted with a drone camera. For example, FIG. 1 shows an example of a drone 100 outfitted with a drone camera 102 capturing monitoring images of solar panels within a solar park 104 having a first solar panel 106, a second solar panel 108, and a third solar panel 110. The drone camera captures monitoring images (e.g., images provided for analysis by the image processing image) of one or more target objects. The monitoring images are both infrared and non-infrared. When capturing the monitoring images, the drone camera uses geotagging to determine and record the location of the objects captured in the monitoring images. The monitoring images are input into the image processing engine with the geotagged locations. Then, the image processing engine uses the model to analyze the monitoring images to determine whether the monitoring images include object features (e.g., data points) that fit within one of multiple categories. To locate the object features, the image processing engine uses a fuzzy clustering process to group objects into cluster locations. After identifying and locating object features, the image processing system outputs the identification and location of the object features. The output is used for maintenance planning related to the objects.

The disclosed aerial monitoring system and method controls data collection (e.g., capturing infrared images, capturing non-infrared images, and/or geotagging images), analysis of data (e.g., training of image processing engine, identifying object features in images, and/or locating object features in images), and output (e.g., identification of object features, location of object features, and/or accuracy of analysis).

Figure 2:
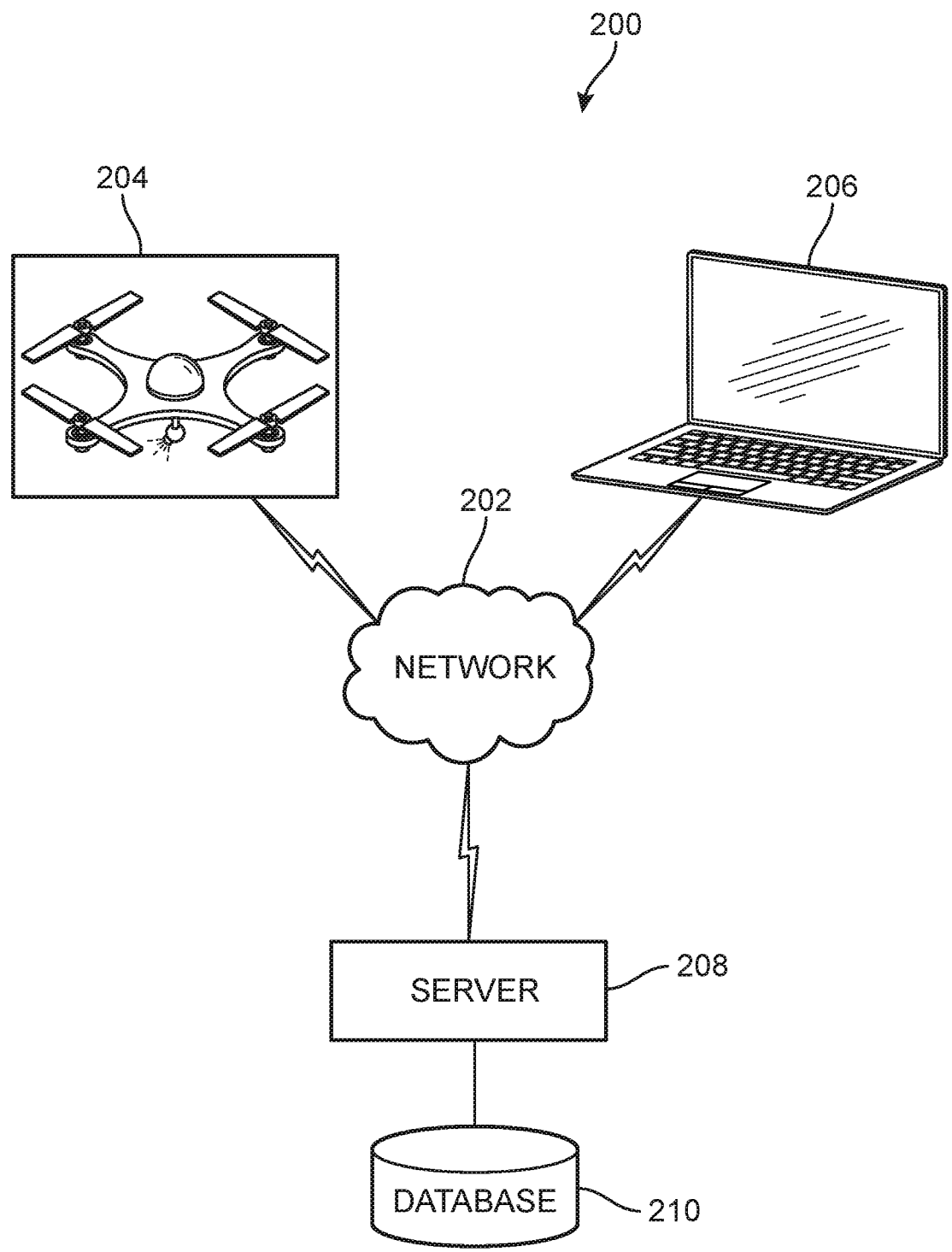
FIG. 2 is a schematic diagram of an embodiment of an aerial monitoring system for identifying and locating object features.

The aerial monitoring system may include one or more user devices, one or more cameras, a server, a database, and a network. For example, FIG. 2 illustrates an example of an aerial monitoring system 200. Aerial monitoring system 200 may include a camera 204, a user device 206, a network 202, a server 208, and a database 210. The components of the aerial monitoring system communicate through the network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN.

The user device may be a computing device used by a user. For example, as shown in FIG. 2, user device 206 may include a tablet computer. In other examples, user device 206 may be a smartphone, a laptop computer, a desktop computer, or another type of computing device. The user device may include a display that provides an interface for the user to input and/or view information. For example, as discussed in more detail below with respect to FIG. 8, the user device may display an interface through which a user may view information about a monitoring object feature, such as a solar panel with thermal damage. User device 206 may include one or more user devices.

The camera may be a drone camera. For example, as shown in FIG. 1, drone camera 102 is mounted on drone 100. The camera is capable of capturing both infrared and non-infrared images. The camera may include one or more cameras. For example, in some embodiments, more than one drone camera may be mounted to a drone. In another example, more than one drone outfitted with a drone camera may be used to capture images. While the drone and camera are shown as one device in FIG. 1, it is understood that the drone may have its own control system (e.g., for controlling its speed and direction) that is connected to the network as well.

The server may be a single computer, the partial computing resources of a single computer, a plurality of computers communicating with one another, or a network of remote servers (e.g., cloud). In the example of FIG. 2, server 208 is in communication with database 210. The server can work with the database to perform the method of the aerial monitoring system. In some embodiments, the server may include an image processing engine.

The training process may include capturing training images of objects that have predefined object features the image processing engine is learning to identify. For example, as shown in FIG. 1, drone 100 outfitted with camera 102 captures images of solar panels. In other embodiments, the training videos may be captured by other methods, such as stationary cameras mounted near the solar panels or a person manually taking photographs with a camera. The training images may be still or moving (e.g., video). The camera used to capture training images captures both infrared and non-infrared images of the objects.

In the embodiment of FIGS. 1-9, the training images include images of solar panels. In this embodiment, the aerial monitoring system and method focuses on identifying object features indicating the health status, or physical state, of solar panels. Accordingly, in this embodiment, the aerial monitoring system and method focuses on identifying object features in the following categories: normal panel, damaged panel, thermal damage, and fallen objects. These categories are merely exemplary. More, less, or different categories may be used by the aerial training system and method. The category of normal panel includes a panel that has normal health and does not fall into one of the other three categories. The other three categories besides normal panel indicate that a solar panel has reduced effectiveness relative to its baseline state, and needs maintenance. The category of physical damage includes a dirty panel or a panel that has suffered damage. For example, the wind may blow an object into a panel with enough force to damage a panel. The category of thermal damage includes panels having areas of elevated temperature only affecting a portion of a solar panel. If left untreated, thermal damage (e.g., a hot spot) can cause an entire solar panel to become defective. The category of fallen objects includes one or more objects covering part or all of a solar panel. An object covering a portion of a solar panel negatively impacts the effectiveness of the solar panel.

The training process may include receiving the training images. For example, FIG. 9 shows an embodiment of an aerial monitoring method 900 in which a step 902 includes receiving training images of training objects with predefined object features. The image processing engine records at least a portion of these training images with an assigned category for each training image in a database for future retrieval during image processing. More specifically, a portion of the training images are each assigned, or labeled, a category corresponding to an object feature the image displays. For example, in the embodiment described below with respect to FIGS. 1-9, a training image can show an object lying on top of a solar panel that will be labeled as "fallen object."

The image processing engine may use graph-based semi-supervised learning to identify object features. Semi-supervised learning combines using unlabeled and labeled data (or, more generally, sets of unlabeled data where only some data points have labels) into an integrated model, such as CNN. In graph-based semi-supervised learning, even a small amount of data is sufficient for effectively identifying object features. Additionally, in some embodiments, the image processing engine can effectively identify object features with far fewer labeled training images compared with the number of unlabeled training images provided to the image processing engine. Fewer labeled training images means that fewer resources are needed to label training images. Thus, the training process can be more efficient than a supervised learning process.

The image processing engine uses the training images to generate a CNN for identifying object features in monitoring images. For example, aerial monitoring method 900 includes a step 904 of building a convolutional neural network using the training images. Then, the image processing engine practices using the CNN with training images. The image processing engine uses the feedback from the practice to improve the application of the model.

Figure 3:
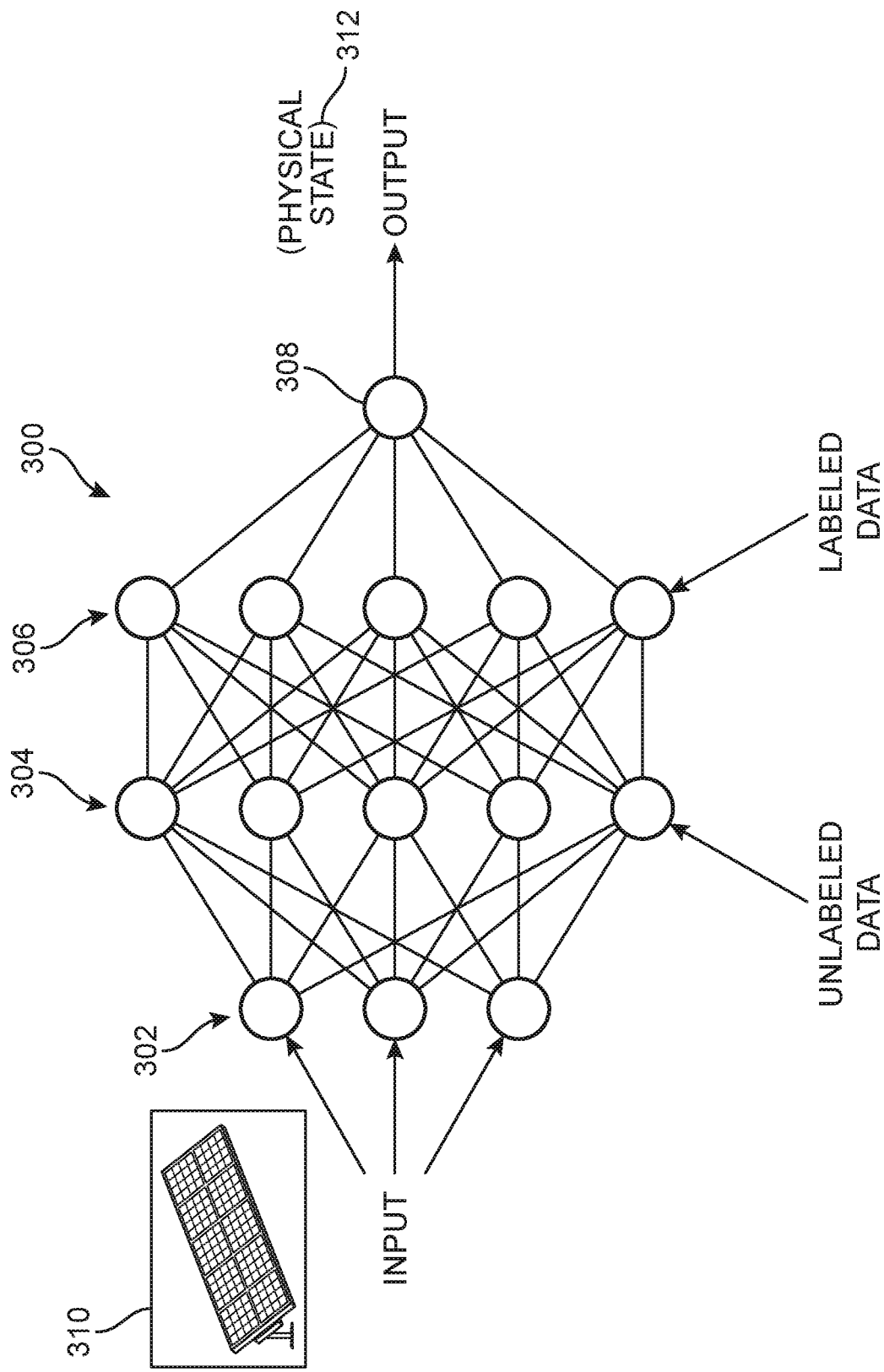
FIG. 3 is a schematic diagram of an embodiment of a convolutional neural network.

As shown in FIG. 3, graph-based semi-supervised learning uses a graphical representation of the data, with a node for each labeled and unlabeled sample. FIG. 3 shows a CNN 300 with a first set of nodes 302 for input, a second set of nodes 304 for unlabeled data, a third set of nodes 306 for labeled data, and a fourth node 308 for output. In this example, the input is a monitoring image 310, which includes a solar panel, and the output is the physical state of the solar panel (e.g., normal, physical damage, thermal damage, fallen object). Graph-based semi-supervised learning involves generating graph edges, estimating the width of the edges, and running graph-based algorithms. As discussed below, when a solar panel image is provided to the image processing engine, the CNN uses the labeled and unlabeled images to identify the type of issue present in the solar panel.

To identify object features, the aerial monitoring system and method generally includes using a drone outfitted with a camera to capture monitoring images of one or more target objects. For example, FIG. 1 shows an example of drone camera 102 capturing monitoring images of solar panels within solar park 104. In particular, drone camera 102 is capturing monitoring images of second solar panel 108, which has a crack 112. The monitoring images captured by the drone camera may be still or moving (e.g., video). The drone camera has geotagging capabilities. In other words, the drone camera has global positioning system (GPS) sensors that automatically add location data to images. In some embodiments, the location data may include GPS coordinates. While capturing monitoring images, the drone can move across the objects (e.g., solar panels) in a pattern, or predefined path. For example, the drone can move in a pattern from left to right in rows or for from top to bottom in columns, such that images of all of the portions of the objects are captured. In some embodiments, the drone camera captures still images of the monitoring objects at a rate of about 20 to 30 frames per second. At such a pace, the drone camera can capture approximately hundreds of thousands of frames in 10-25 minutes.

The aerial monitoring method includes receiving the monitoring objects. For example, aerial monitoring method 900 includes a step 906 of receiving monitoring images of monitoring objects and geotags indicating global positioning system coordinates of the monitoring objects appearing in the monitoring images. As described in more detail below with reference to FIG. 4, after the image processing engine receives monitoring images, the image processing engine uses the CNN to analyze the monitoring images. The analysis identifies whether the monitoring images contain features fitting into one or more of various different categories. For example, aerial monitoring method 900 includes a step 908 of using the convolutional neural network to analyze the monitoring image object features for similarity with the predefined object features.

The analysis of the monitoring images can include categorizing the monitoring images. For example, aerial monitoring method 900 includes a step 910 of categorizing the monitoring images based on the analysis of the monitoring images. In the embodiment described below with respect to FIGS. 1-9, the monitoring images of solar panels are analyzed to determine whether the monitoring images contain features fitting into one of the following categories: normal panel, physical damage, fallen object, or thermal damage. During analysis, the monitoring images are processed by breaking the images down into pixels, which are then transformed into matrix values. The model generated during the training process is then applied to the matrix values to determine whether the monitoring images contain features fitting into one of four different categories.

The process of analyzing the monitoring images can include mosaicking the monitoring images. During mosaicking, multiple monitoring images may be pieced together to create a single image. For example, the monitoring images, which may each include bits and pieces of an object, are pieced together to show a whole object. By capturing images of the monitoring objects in an organized pattern, the process of mosaicking can be streamlined.

Figure 4:
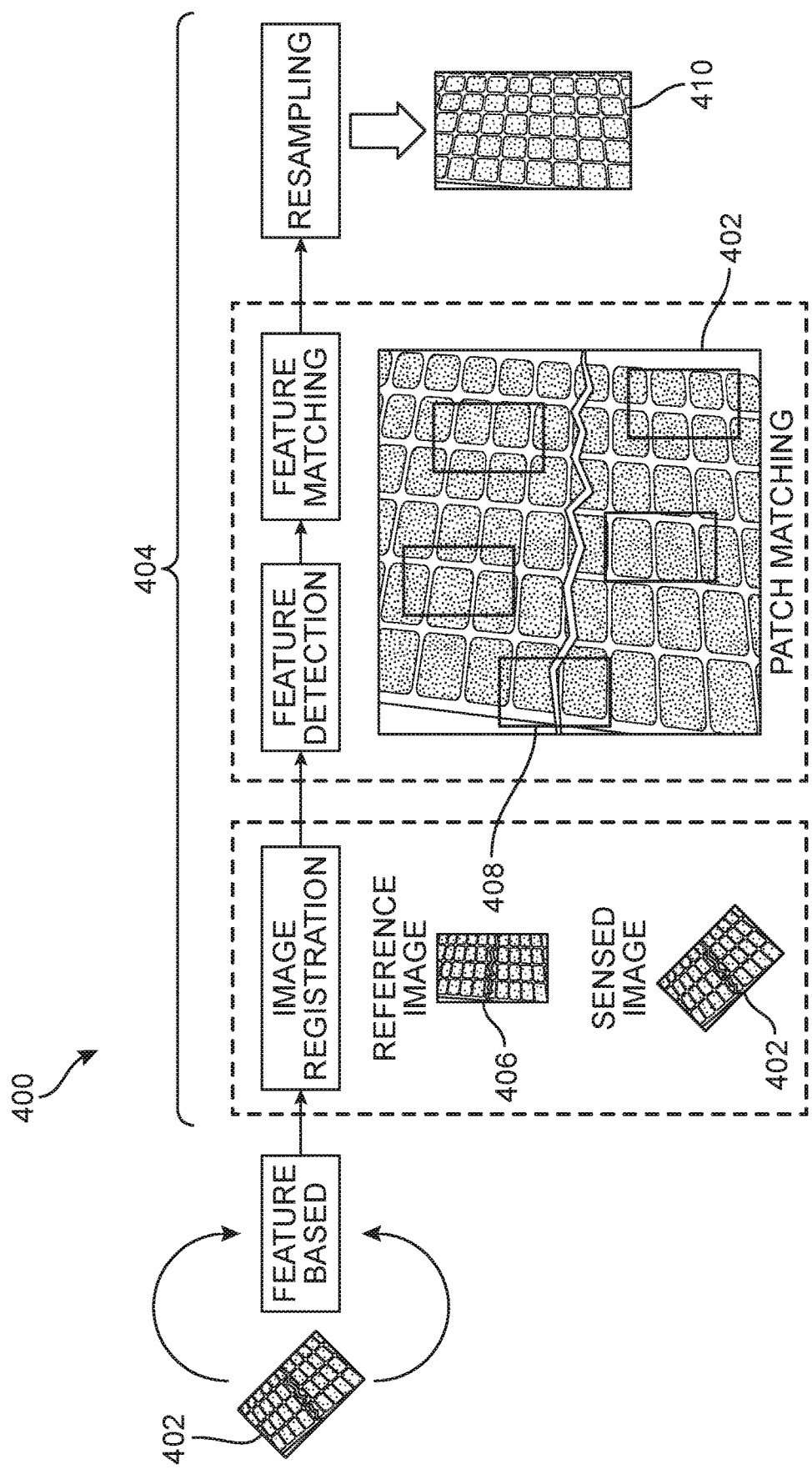
FIG. 4 is a schematic diagram demonstrating a first portion of an analysis of a monitoring image.
Figure 5:
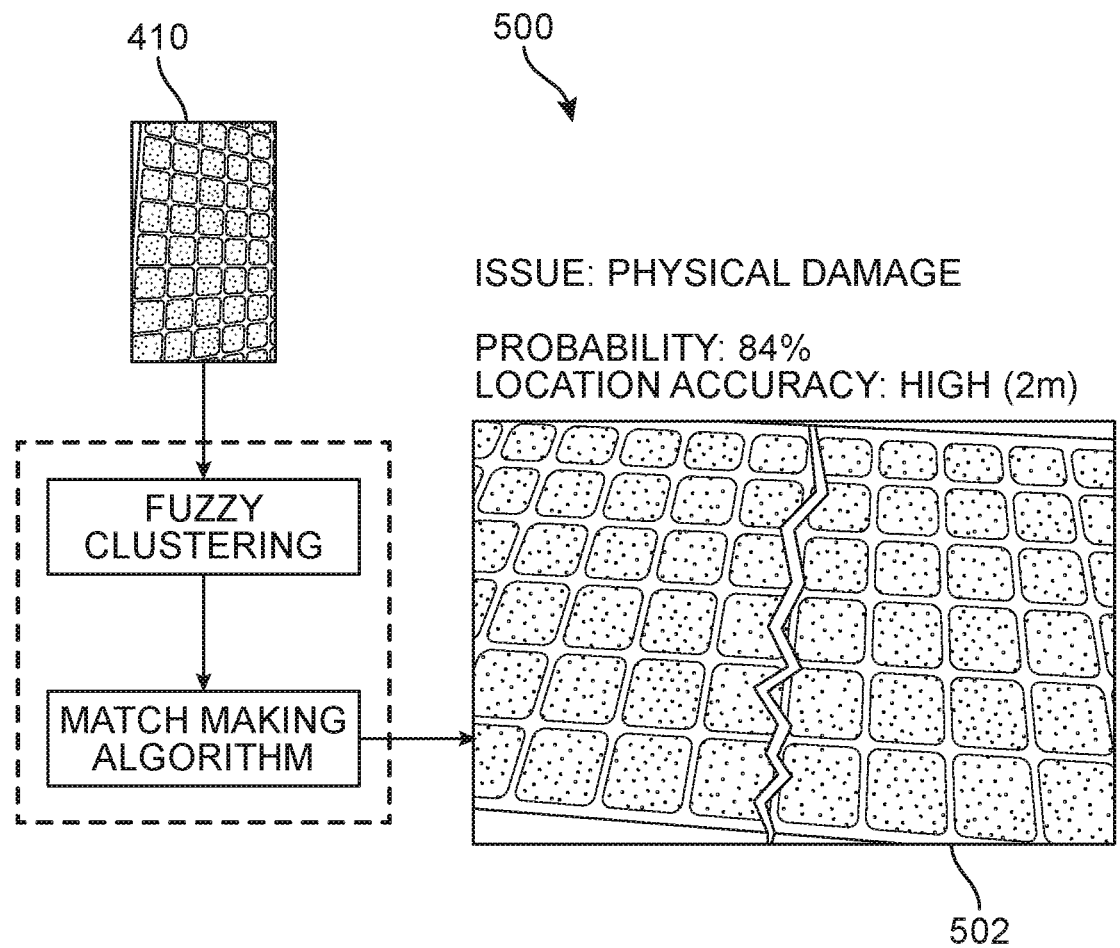
FIG. 5 is a schematic diagram demonstrating a second portion of an analysis of a monitoring image.

FIGS. 4 and 5 show an example of details of analysis of a monitoring image. FIG. 4 is a schematic diagram demonstrating a first portion 400 of an analysis of a monitoring image. FIG. 5 is a schematic diagram demonstrating a second portion 500 of an analysis of a monitoring image. Analyzing the monitoring images can include a feature-based process, such as a CNN process, applied to the mosaicked image after the spatial-based algorithm is applied to the mosaicked image. For example, FIG. 4 shows an example of a CNN process 404, which includes a feature-based process, feature detection, feature matching, and resampling. FIG. 4 shows a monitoring image 402 (input image) going through a feature-based process. More specifically, in the example shown in FIG. 4, monitoring image 402 goes through an image registration process in which monitoring image 402 is compared with a reference image 406, which is a training image. As shown in FIG. 4, the image registration can still be accurately performed when the monitoring image is captured from a different angle than the reference (training) image. This is because the image registration process makes use of points, lines, and shapes in an object (e.g., a solar panel). The image registration process establishes a correspondence between especially distinct points in images. In some cases, geometrically aligning the training image with the monitoring image can improve the results of the image registration process.

The image registration process can include feature detection and feature matching. The feature detection and feature matching is also known as patch matching. FIG. 4 shows an example of feature detection and feature matching. While it is understood that feature detection and feature matching are performed on both the reference image and the sensed image, FIG. 4 only shows monitoring image 402. FIG. 4 shows how patches, including patch 408, are detected on monitoring image 402. The same points are detected on reference image 406. This feature detection of the patches is done using a Difference of Gaussian function. Once the process of feature detection is completed, the image registration process uses a feature matching process using Nearest Neighbor Distance Ratio (NNDR) to measure the similarity between features of a training image and features of a monitoring image. In other words, the detected patches on monitoring image 402 and reference (training) image 406 are compared for similarity. The image registration process further includes a resampling process using Random Sample Consensus (RANSAC) to increase the probability of finding the optimal result. The resampling process blends the pixel colors in the overlapped region between monitoring images to avoid the seams. Feature-based weighted averaging color values can be used to blend the overlapping pixels. The resampling process produces a composed/blended image 410 of monitoring image 402 and reference image 406.

Analyzing the monitoring images can include using the CNN to create a first convolution layer, which includes using a spatial-based process where a magnitude is allotted to different positions (e.g., x, y) in the mosaicked image. Based on the spatial-based process, the mosaicked image is divided into small squares of input data. The squares include a matrix of pixel values. The output of the first convolution layer is the input for a first sub-sampling in which the spatial size of the matrix of pixel values is further reduced. The output from the first convolution is reduced further by using a function, such as {Max, Average, Sum, Min}. The output of the first sub-sampling becomes the input for a second convolution layer. The output of the second convolution becomes the input for a second sub-sampling layer to even further reduce the spatial size of the matrix of pixel values. The output of second sub-sampling layer goes into a fully connected layer. The fully connected layer indicates that every neuron in the previous layer is connected to every neuron on the next layer. The function of the fully connected layer is to use the features of the fully connected layer to categorize the monitoring image into one or more of various different categories. In some embodiments, the output of convolution can be received in the form of 1 or 0, where 1 represents "yes" and 0 represents "no." For example, the output of (1,0,0,0) could represent a category, such as physical damage.

The probability of properly identifying object features of monitoring images depends on the number of training images. In other words, the probability is directly proportional to the amount of trained data (training images). The more training images, the better the probability will generally be for properly identifying an object feature. The probability also depends on the number of issue categories that the training images are divided into. The probability further depends on the number of conventional (e.g., convolution and fully connected) layers and sub-sampling layers. Increasing the number of layers will increase the probability of properly identifying an object feature. As discussed above, once a monitoring image is fed to the CNN, the CNN compares this monitoring image with the training images. The CNN examines all of the pixels using the convolution function, sub-sampling, and fully connected layer, i.e. classification or categorization. These layers extract the useful features of the monitoring image.

Analyzing the monitoring images can include an image composting process involving clubbing different parts of the image together to form a single image. This composting process is a one-time training process.

Figure 7:
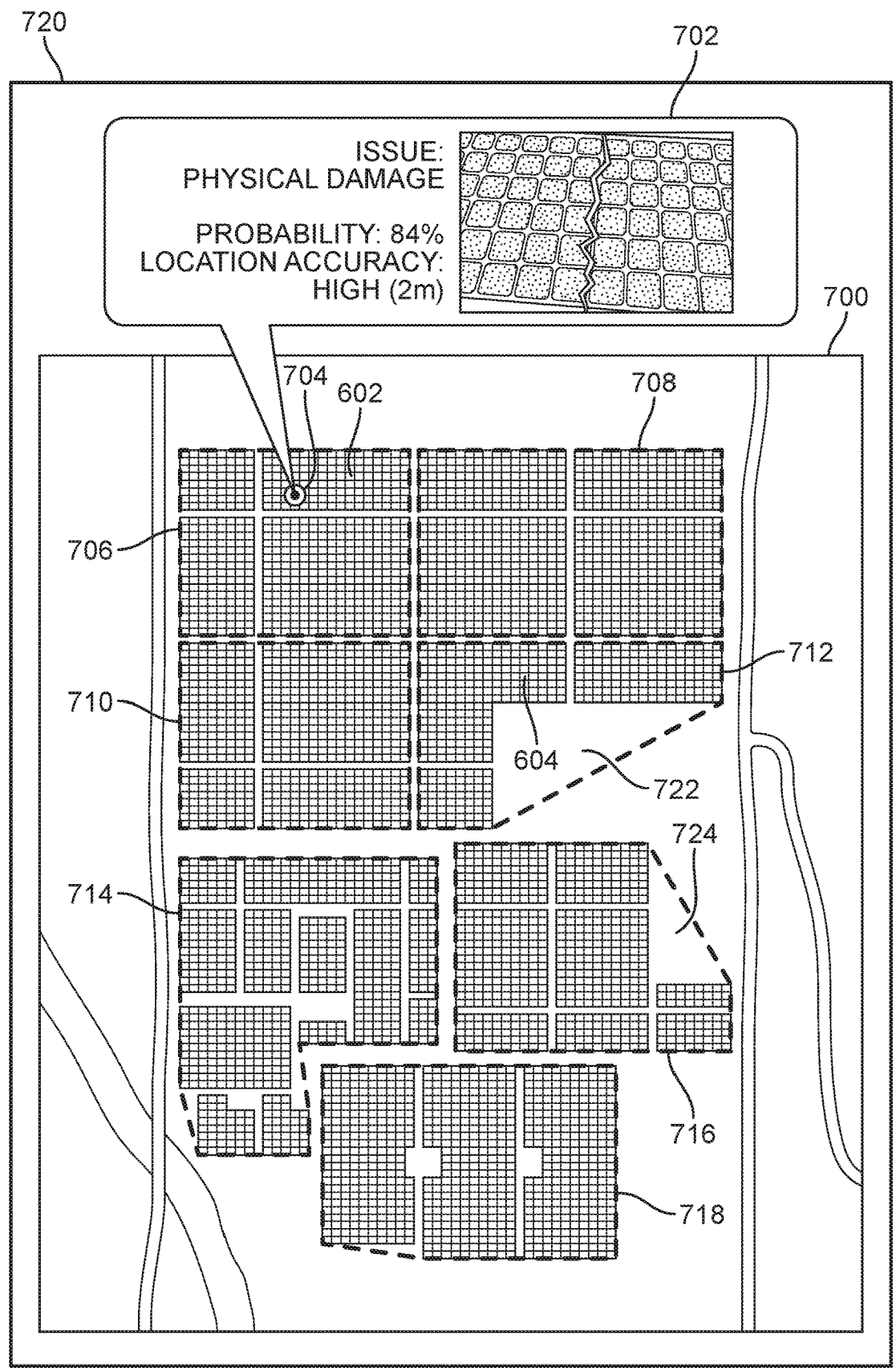
FIG. 7 is a schematic diagram of a display interface showing a map of the solar park from FIG. 6.

The object feature of the monitoring image that matches with the highest pixel feature from the training images acts as the output with associated probability, as described in more detail below with reference to FIGS. 7 and 8. This probability depends on the number of pixels matched with the training images. The higher the number of matching pixels, the higher the probability of properly identifying an object feature. A threshold value, such as a percentage, is set for the probability of a particular pixel. Meeting the threshold value causes a particular object issue related to the particular pixel to be reported. For example, if the probability that an object feature has been properly identified as belonging to a particular issue category meets the threshold value, the object feature is categorized under the issue category. In a more specific example, if the threshold value is 80%, and 82% of the pixels of an object feature of a monitoring image match with the pixels of a training image labeled as belonging in the category of thermal damage, then the object feature is categorized as showing thermal damage.

Figure 6:
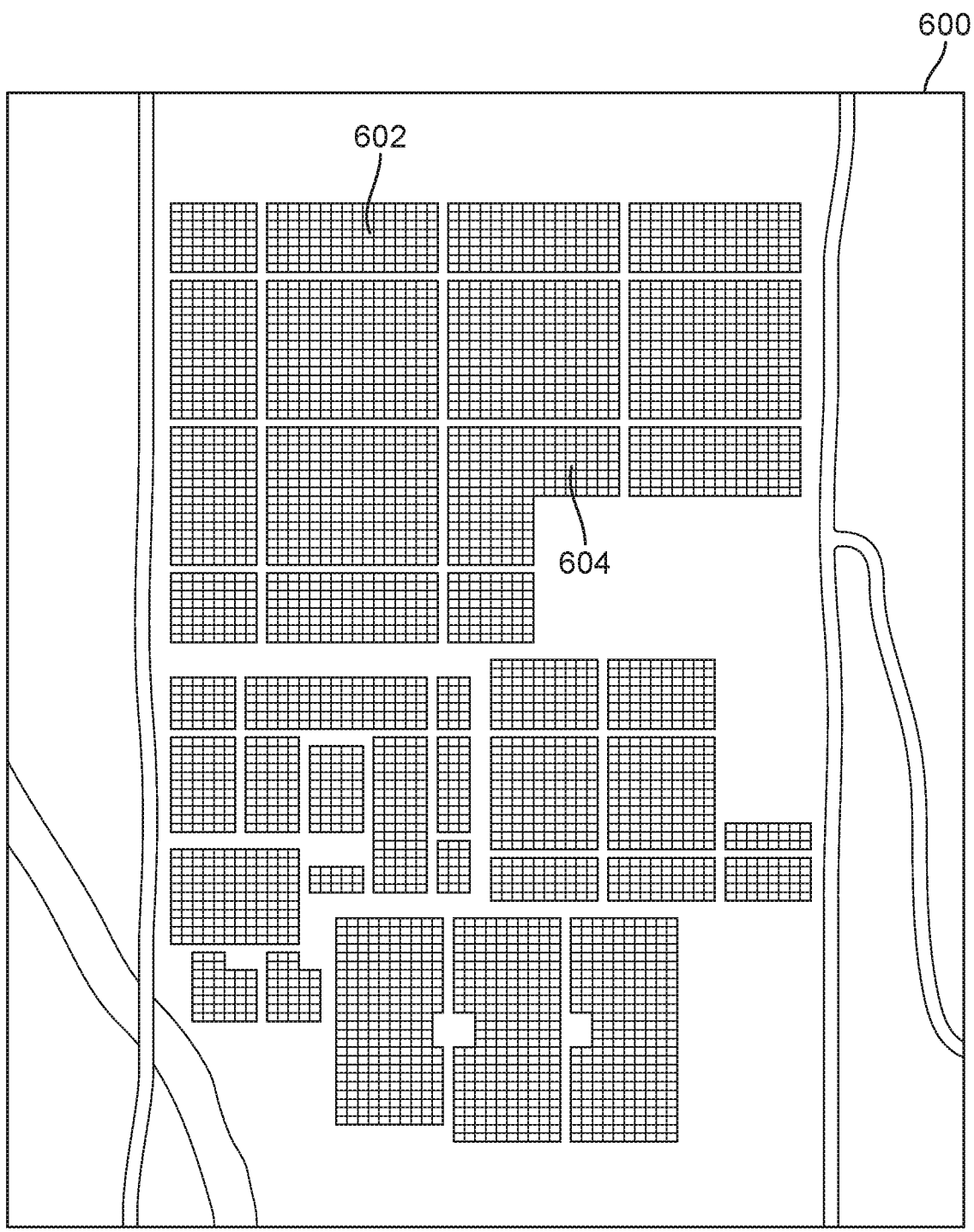
FIG. 6 is a schematic diagram of an embodiment of a solar park.

To locate the object features, the image processing engine uses a fuzzy clustering process to group objects into cluster locations. Fuzzy clustering can be performed from training images or monitoring images. The purpose of fuzzy clustering is to take many objects in a large area and group the objects together in clusters to create reference points. Accordingly, fuzzy clustering can be performed if the objects being clustered appear in the images and the images include GPS information (e.g., geotags). An example of fuzzy clustering is shown in FIGS. 6 and 7. FIG. 6 shows an aerial image 600 of a solar park. The solar park includes 39 solar panels, including, for example, a first solar panel 602 and a second solar panel 604. During fuzzy clustering, the image processing unit groups the individual solar panels together into various clusters based on proximity to each other. For example, FIG. 7 shows a display interface 720 displaying a map 700 of the solar park with the solar panels broken up into clusters. Map 700 includes a first cluster 706, a second cluster 708, a third cluster 710, a fourth cluster 712, a fifth cluster 714, a sixth cluster 716, and a seventh cluster 718. First cluster 706 includes first solar panel 602, along with three other solar panels. Second cluster 708 includes four solar panels. Third cluster 710 includes four solar panels. Fourth cluster 712 includes three solar panels, including second solar panel 604, which has an irregular shape compared with the other solar panels in fourth cluster 712.

The clusters are defined around the borders of solar panels such that entire solar panels, as opposed to only portions of solar panels are included in each cluster. As shown in FIG. 7, fourth cluster 712 is given a shape that captures the solar panels with a gap 722 bordered by the solar panels and an edge of the cluster line. Fifth cluster 714 includes 13 solar panels. Sixth cluster 716 includes 8 clusters, and also includes a gap 724 similar to gap 722 included in fourth cluster 712. Seventh cluster 718 includes three solar panels. The image processing engine already knows the GPS coordinates of each monitoring image from the geotags provided at the time the images were captured. Location intelligence on the cluster locations can be applied by a match-making algorithm using proximity weight on cluster locations. For example, as shown in FIG. 5, composed/blended image 410 from resampling is used for fuzzy clustering and the match-making algorithm. By applying fuzzy clustering and match-making algorithms to the composed/blended image, the location of the object features can be further verified.

When the image processing engine knows the GPS coordinates of a monitoring object and the location of a cluster, the image processing unit can find the center of a cluster and then capture images of the entire cluster in the manner discussed above with respect to identification of object features. Then, the image processing engine can use the GPS coordinates of the monitoring objects and a fuzzy clustering process to group the monitoring objects into cluster locations. For example, aerial monitoring method 900 includes a step 912 of using the GPS coordinates of the monitoring objects and a fuzzy clustering process to group the monitoring objects into cluster locations. This way, the image processing engine can keep track of which images were captured from a particular cluster. This information can be used when providing the output discussed below. For example, FIG. 5 shows output as a representative image 502, issue category (e.g., physical damage), a probability (probability that the object feature has been properly identified expressed as a percentage), and location accuracy (accuracy of the location of the object feature). In the example of FIG. 5, the probability is 84% and the location accuracy is "High (2 m)." Probability and location accuracy are discussed in more detail below with reference to FIG. 8.

After identifying and locating object features, the image processing system outputs the identification and location of the object features on an interface display. For example, aerial monitoring method 900 includes a step 914 of outputting a first category and a first cluster location for a first monitoring object of the monitoring objects based on the results of both categorizing the monitoring images and grouping the monitoring objects into cluster locations. FIGS. 7-8 show examples of interface displays for showing output of the aerial monitoring system and method. These interface displays, as well as any other interface display related to the aerial monitoring system and method, may be provided on a user device, such as user device 206.

The accuracy of locating object features is measured by the distance between the center point of the cluster and the solar panel with damage. As discussed above, a solar park can be divided into multiple clusters and the position of each cluster can be predefined with GPS coordinates. A center point of the cluster can be used to determine the location accuracy of a solar panel having an object feature (e.g., issue or problem). As also discussed above, a drone can continuously capture monitoring images of a solar panel in a cluster. The captured monitoring images can be continuously fed into the CNN to check the issue category and associated probability of the damage by comparing these monitoring images with the training images. If the damage is confirmed (i.e., the probability of proper identification of the issue is above the threshold probability), the GPS coordinates of the damaged solar panel frame is compared with the GPS coordinates of the cluster center point as the reference point. The distance between the center point of the cluster and the solar panel with the damage defines the location accuracy. The location is narrowed down to the cluster having a minimum distance between the center point of the cluster and the solar panel identified with the issue in the monitoring image(s). In some embodiments, if the location is 0-5 meters then the accuracy is taken as high. In such an embodiment, if the location is in the range of 5-10 meters then, the accuracy is considered as medium. Further to this embodiment, any location above 10 m is considered low. The accuracy may be output in the manner described below with reference to FIGS. 7 and 8.

In some embodiments, the output from the analysis of monitoring images can be shown in a table. For example, as shown in FIG. 8, the output is displayed as an output table 800 having a column for the cluster "identification number," a column for "issue category," a column for "probability," a column for "location accuracy," a column for "confirm damage," a column for "initiate maintenance," a column for representative images, and a column for "location." The column for "cluster identification" can show a name or number (e.g., see FIG. 8) identifying the cluster where the issue has been spotted. The column for "issue category" includes the type of object feature that has been identified by the image processing engine. The column for "probability" includes the probability that the object feature has been properly identified. As shown in FIG. 8, the probability can be expressed with a percentage and a degree of probability (e.g., "high," "medium," and "low"). The column for "location accuracy" includes the accuracy of the location of the object feature. As shown in FIG. 8, the location accuracy can be expressed with a number of meters the location is within the identified cluster and a degree of accuracy (e.g., "high," "medium," and "low"). For example, in the first row of output table 800, the location accuracy is given as "2 m—HIGH." In the case of this example, this accuracy means that the location is within 2 meters of cluster ID 8, and that the accuracy of this location is high. In some embodiments, only one of the percentage and the degree of probability is displayed. In other embodiments, more location information is displayed with the percentage and/or degree of probability.

The column for "confirm damage" is an interactive column that allows an operator to select whether or not the damage should be confirmed. Sliding a switch from "no" to "yes" can initiate confirmation of damage to the cluster identified in the respective row. For example, initiating confirmation can include deploying a maintenance unit to the cluster identified in the respective row of output table 800. The column for "initiate maintenance" is an interactive column that allows an operator to select whether or not the damage should be confirmed. Sliding a switch from "no" to "yes" can initiate maintenance to the cluster identified in the respective row. For example, initiating maintenance can include deploying a maintenance unit to the cluster identified in the respective row.

The column for "image" shows a representative image selected from the monitoring images. The representative image shows the object feature (e.g., issue or problem) that has been identified. For example, the representative image shown in the first row of output table 800 includes a tree branch that has fallen on a solar panel. In this particular example, the tree branch may have also caused damage to the solar panel. Accordingly, the physical damage shown in this image may also be identified on output table 800.

The column for "location" includes a button in each row that allows a user to access the map of the solar panels, so that the user can see where the cluster with the monitoring object feature is located. For example, the output display interface may include map 700 of solar panels shown in FIG. 7. Map 700 may include a flag 704, as shown in FIG. 7, representing that an issue or problem has been spotted in first cluster 706. A user can select first cluster 706 to see the details of issue or problem. For example, the interface display may show a pop-up window 702 with a representative image, issue category, and probability. In other embodiments, the pop-up window can display other information related to the identified and located issue.

The output of the analysis of monitoring images is used for maintenance planning related to the monitoring objects. A maintenance manager can prioritize which solar panels to attend to, and in which order the solar panels should be attended to. For example, in some embodiments, the monitoring object features corresponding to certain issue categories in the output table could be prioritized for confirmation of damage and/or repair of damage over the monitoring object features corresponding to other issue categories. For example, the monitoring object feature (issue category) in the first and second rows of output table 800 includes an issue category of "physical damage" and the monitoring object feature in the third and fourth rows of output table 800 includes an issue category of "thermal damage." In such an example, a maintenance unit can be deployed to the monitoring object feature in the third row before a maintenance unit is deployed to the monitoring object feature in the first row. In some embodiments, this prioritization could be selected because an issue related to thermal damage could become a safety concern.

In some embodiments, the monitoring object features corresponding to higher probabilities in the output table could be prioritized for confirmation of damage and/or repair of damage over the monitoring object features corresponding to lower probabilities. For example, the monitoring object feature in the first row of output table 800 includes a probability of 84%, and the monitoring object feature in the second row of output table 800 includes a probability of 65%. In such an example, a maintenance unit can be deployed to the monitoring object feature in the first row before a maintenance unit is deployed to the monitoring object feature in the second row.

Additionally, to further conserve resources, the types of maintenance units deployed to different locations can be selected based on the type of maintenance requested. For example, damage can be confirmed by a maintenance unit with less skill than a maintenance unit that makes repairs. Accordingly, a first maintenance unit having less skill than a second maintenance unit could be deployed to confirm damage. And the second maintenance unit could be deployed to repair damage. In this way, the maintenance units could be efficiently used.

Figure 8:
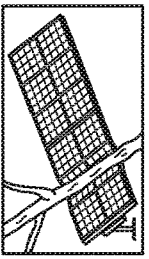
FIG. 8 is a schematic diagram of a display interface showing an output table.
Figure 8:
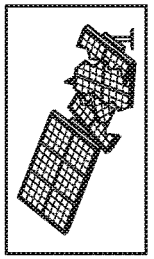
Figure 8:
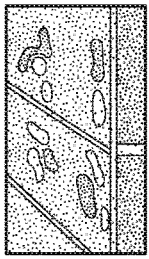
Figure 8:
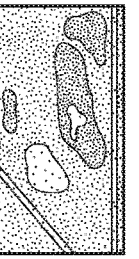
Figure 9:
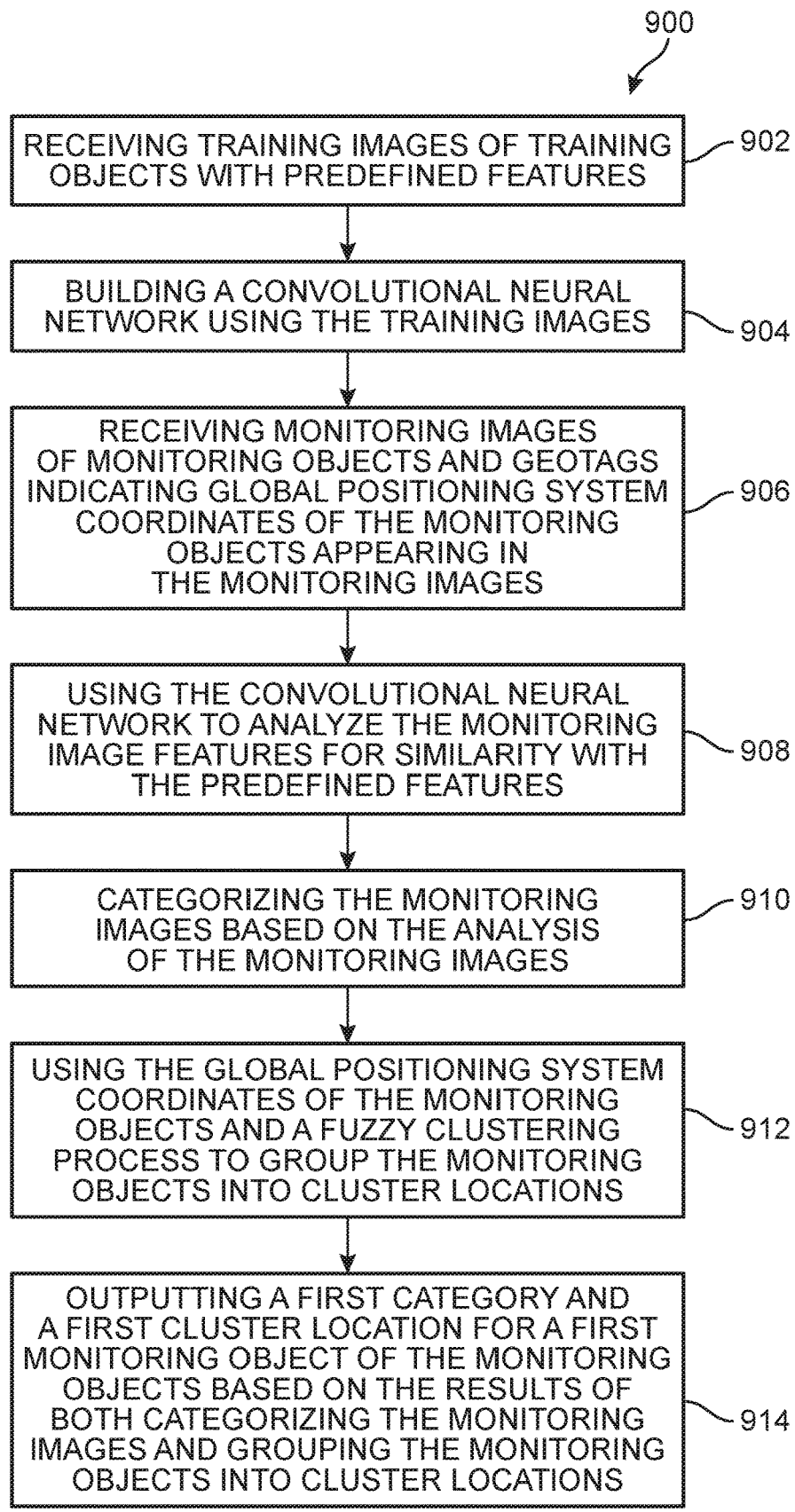
FIG. 9 shows a method of identifying and locating object features.

The output for the aerial monitoring system and method can include more or less information than the information shown in FIG. 8. Additionally, when the aerial monitoring system is monitoring other types of objects, such as electric utility equipment, the issue categories may be different from those shown in the embodiment of FIGS. 1-9.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of using an aerial monitoring system for identifying and locating object features to create a maintenance plan, comprising:
   receiving training images of training objects, wherein the training images include predefined object features indicating a physical state of the training objects;
   building a convolutional neural network using the training images;
   receiving monitoring images of monitoring objects in a common area and geotags indicating global positioning system coordinates of the monitoring objects appearing in the monitoring images;
   mosaicking the monitoring images to create a single mosaicked image, wherein the single mosaicked image includes monitoring image object features each indicating a physical state of the monitoring objects;
   using the convolutional neural network to analyze the monitoring image object features for similarity with the predefined object features;
   using the convolutional neural network to categorize the monitoring images into maintenance issue categories based on the physical state of the monitoring images indicated by the analyzed monitoring image object features;
   using the global positioning system coordinates of the monitoring objects together with a fuzzy clustering process to group the monitoring objects into a plurality of cluster locations based on proximity between monitoring objects, each cluster location defining a region within the common area, wherein each cluster location includes a center and more than one monitoring object of the monitoring objects;
   determining which cluster location of the plurality of cluster locations each monitoring image object feature belongs to;
   generating a map displaying map images of the monitoring objects in positions corresponding to their global positioning system coordinates and displaying indicia identifying the plurality of cluster locations; and
   outputting and displaying a first maintenance issue category and a first cluster location for a first monitoring object of the monitoring objects based on the results of both categorizing the monitoring images and determining which cluster location of the plurality of cluster locations each monitoring image object feature belongs to.

2. The method of claim 1, further comprising:
   deploying one of a first type of maintenance unit and a second type of maintenance unit based on output from outputting a first category and a first location.

3. The method of claim 1, wherein the monitoring objects are solar panels and wherein the maintenance issue categories include one or more of physical damage, fallen object, and thermal damage, and
   wherein the convolutional neural network conducts its analysis by using sub-sampling and a fully connected layer.

4. The method of claim 1, further comprising:
   deploying a maintenance unit to a first monitoring object feature having a higher probability of being properly identified relative to a second monitoring object having a lower probability of being properly identified based on the output from outputting a first maintenance issue category and a first cluster location.

5. The method of claim 1, wherein determining which cluster location of the plurality of cluster locations each monitoring image object feature belongs to includes comparing the global positioning system coordinates of each monitoring image object feature to global positioning system coordinates of the center of each cluster.

6. The method of claim 1, wherein using the convolutional neural network includes establishing a correspondence between a number of distinct points within the single mosaicked image to detect features within the single mosaicked image.

7. The method of claim 6, wherein using the convolutional neural network includes using a difference of Gaussian function to detect features in the single mosaicked image.

8. The method of claim 7, using the convolutional neural network includes using a nearest neighbor distance ratio to measure the similarity between the detected features in the single mosaicked image and at least one predefined object feature of at least one training image of the training images.

9. The method of claim 1, wherein the instructions, upon execution, further cause the one or more computers to apply a match-making algorithm using proximity weight on the plurality of cluster locations to further verify the location of the cluster locations.

10. A non-transitory computer-readable medium storing software comprising instructions executable by one or more computers which, upon such execution, cause the one or more computers to:
   receive training images of training objects, wherein the training images include predefined object features indicating a physical state of the training objects;
   build a convolutional neural network using the training images;
   receive monitoring images of monitoring objects in a common area and geotags indicating global positioning system coordinates of the monitoring objects appearing in the monitoring images;
   mosaic the monitoring images to create a single mosaicked image, wherein the single mosaicked image includes monitoring image object features each indicating a physical state of the monitoring objects;
   use the convolutional neural network to analyze the monitoring image object features for similarity with the predefined object features;
   use the convolutional neural network to categorize the monitoring images into maintenance issue categories based on the physical state of the monitoring images indicated by the analyzed monitoring image object features;
   use the global positioning system coordinates of the monitoring objects together with a fuzzy clustering process to group the monitoring objects into a plurality of cluster locations based on proximity between monitoring objects, each cluster location defining a region within the common area, wherein each cluster location includes a center and more than one monitoring object of the monitoring objects;

determine which cluster location of the plurality of cluster locations each monitoring image object feature belongs to;

generate a map displaying map images of the monitoring objects in positions corresponding to their global positioning system coordinates and display indicia identifying the plurality of cluster locations; and output and display a first maintenance issue category and a first cluster location for a first monitoring object of the monitoring objects based on the results of both categorizing the monitoring images and determining which cluster location of the plurality of cluster locations each monitoring image object feature belongs to.

11. The non-transitory computer-readable medium storing software of claim 10, wherein the monitoring objects are solar panels and wherein the maintenance issue categories include one or more of physical damage, fallen object, and thermal damage.

12. The non-transitory computer-readable medium storing software of claim 11, wherein using the convolutional neural network includes establishing a correspondence between a number of distinct points within the single mosaicked image to detect features within the single mosaicked image.

13. The non-transitory computer-readable medium storing software of claim 12, wherein using the convolutional neural network includes using a difference of Gaussian function to detect features in the single mosaicked image.

14. The non-transitory computer-readable medium storing software of claim 13, wherein using the convolutional neural network includes using a nearest neighbor distance ratio to measure the similarity between the detected features in the single mosaicked image and at least one predefined object feature of at least one training image of the training images.

15. The non-transitory computer-readable medium storing software of claim 10, wherein the instructions, upon execution, further cause the one or more computers to apply a match-making algorithm using proximity weight on the plurality of cluster locations to further verify the location of the cluster locations.

16. An aerial monitoring system for identifying and locating object features to create a maintenance plan, comprising:

one or more computers and one or more storage devices storing instructions that are operable, when executed by the one or more computers, to cause the one or more computers to:

receive training images of training objects, wherein the training images include predefined object features indicating a physical state of the training objects;

build a convolutional neural network using the training images;

receive monitoring images of monitoring objects in a common area and geotags indicating global positioning system coordinates of the monitoring objects appearing in the monitoring images;

mosaic the monitoring images to create a single mosaicked image, wherein the single mosaicked image includes monitoring image object features each indicating a physical state of the monitoring objects;

use the convolutional neural network to analyze the monitoring image object features for similarity with the predefined object features;

use the convolutional neural network to categorize the monitoring images into maintenance issue categories based on the physical state of the monitoring images indicated by the analyzed monitoring image object features;

use the global positioning system coordinates of the monitoring objects together with a fuzzy clustering process to group the monitoring objects into a plurality of cluster locations based on proximity between monitoring objects, each cluster location defining a region within the common area, wherein each cluster location includes a center and more than one monitoring object of the monitoring objects;

determine which cluster location of the plurality of cluster locations each monitoring image object feature belongs to;

generate a map display map images of the monitoring objects in positions corresponding to their global positioning system coordinates and display indicia identifying the plurality of cluster locations; and output and display a first maintenance issue category and a first cluster location for a first monitoring object of the monitoring objects based on the results of both categorizing the monitoring images and determining which cluster location of the plurality of cluster locations each monitoring image object feature belongs to.

17. The aerial monitoring system of claim 16, wherein determining which cluster location of the plurality of cluster locations each monitoring image object feature belongs to includes comparing the global positioning system coordinates of each monitoring image object feature to global positioning system coordinates of the center of each cluster.

18. The aerial monitoring system of claim 16, wherein using the convolutional neural network includes establishing a correspondence between a number of distinct points within the single mosaicked image to detect features within the single mosaicked image.

19. The aerial monitoring system of claim 18, wherein using the convolutional neural network includes using a difference of Gaussian function to detect features in the single mosaicked image.

20. The aerial monitoring system of claim 19, wherein using the convolutional neural network includes using a nearest neighbor distance ratio to measure the similarity between the detected features in the single mosaicked image and at least one predefined object feature of at least one training image of the training images.

* * * * *